April 19, 1932.  W. J. KIRKPATRICK  1,854,797

TIRE VALVE CONNECTION

Filed June 20, 1929

INVENTOR :
William J. Kirkpatrick,
By Attorneys,
Fraser, Myers & Manley.

Patented Apr. 19, 1932

1,854,797

UNITED STATES PATENT OFFICE

WILLIAM J. KIRKPATRICK, OF RICHMOND HILL, NEW YORK, ASSIGNOR TO A. SCHRADER'S SON, INCORPORATED, OF NEW YORK, N. Y., A CORPORATION OF NEW YORK

TIRE VALVE CONNECTION

Application filed June 20, 1929. Serial No. 372,411.

The present invention relates to connections for tire valve stems or the like, and aims to provide certain improvements therein. More particularly it relates to a valve stem connection intended for use in coupling a fluid pressure supply line to a valve stem fitted to an inner tube (for the purpose of either inflating a tire or) preparatory to curing said inner tube in a mold.

According to one method of forming inner tubes for pneumatic tires and the like, the valve stem containing the valve insides therein is vulcanized into the tube simultaneously with the curing or vulcanization of the tube, during which operation the valve check proper of the valve inside is held unseated by the valve unseating pin of the valve stem connection. In practice, the valve check is unseated to its maximum extent for the purpose of expediting the venting of the tube after the vulcanizing operation. The valve inside spring is thus held under compression throughout the entire vulcanizing period, which action, it has been found, impairs the retractile force of the spring.

To overcome such stresses upon valve inside springs during inflation or vulcanization of an inner tube, I provide a tire valve connection which will hold the valve spring under maximum compression for but a small proportion of the time required for inflating the tube or completing the vulcanizing operation, notwithstanding that the valve check will be maintained in open position throughout said period. This I accomplish by providing a tire valve connection having a valve unseating means, which, under fluid pressure, is responsive to partially relieve the compression stress upon the valve spring. According to my device the valve unseating means will unseat the valve check and compress the valve spring in the same manner as do the conventional valve unseating means, but upon being subjected to fluid pressure it will partially recede, thereby relieving the compression stress on the spring. Upon the fluid pressure being relieved, the valve unseating means again unseats the valve check to its maximum amount. The invention also contemplates other features of novelty which will be hereinafter more fully described.

A preferred embodiment of my invention associated with a quick-acting coupling is shown in the accompanying drawings, wherein Figure 1 is a side elevation with parts broken away, showing the operative mechanism of a tire valve connection embodying my invention applied upon a valve stem.

Figure 1:
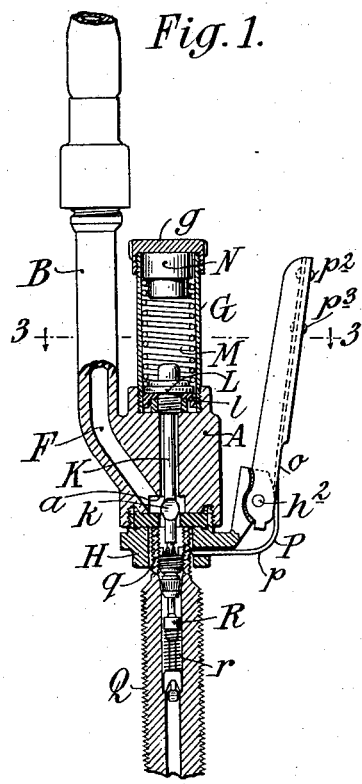

Referring to the drawings let A indicate a substantially cylindrical casing provided with an offset tubular portion B extending substantially parallel to the axis of the casing A. The casing at its opposite ends is formed with recesses C and D respectively, which recesses are in communication with each other through an axial duct E. A passage F connects the recess D with the interior of the offset tubular portion B. The interior wall surrounding the recess C is screw-threaded and has fitted therein a cylinder G formed with a screw-threaded closure cap $g$. The interior wall surrounding the recess D is also screw-threaded and fitted with a fitting H. Between the base of the recess D and the top face of the fitting H there is provided a packing gasket J having a central opening $j$ therein, said packing being adapted to make a leak-tight joint with the top of a tire valve nipple when the fitting H is applied thereover.

Figure 2:
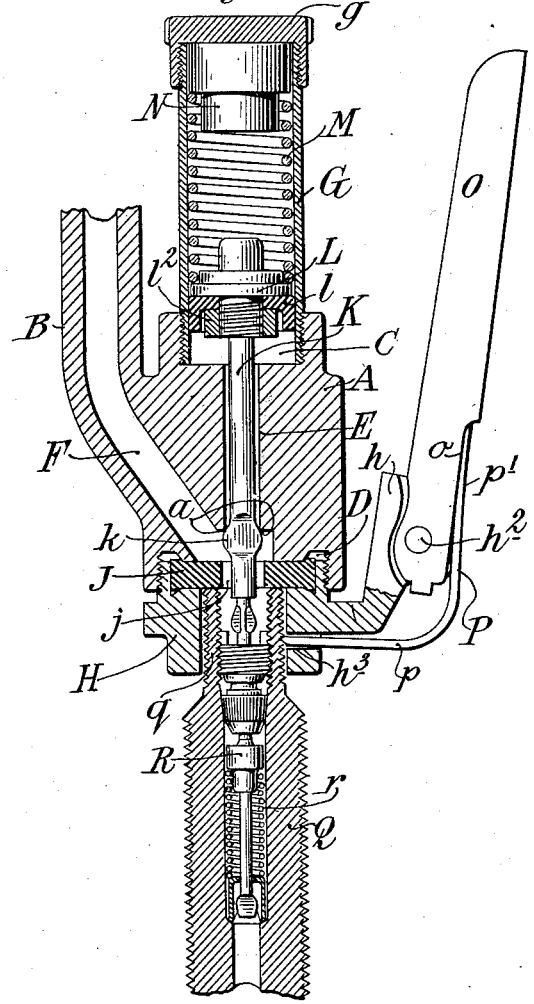
Fig. 2 is a view similar to Fig. 1 on a larger scale, showing the valve pin unseating means in retracted position.
Figure 3:
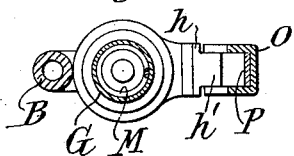
Fig. 3 is a section taken substantially along the plane of the line 3—3 of Fig. 1.

Extending through the duct E in the casing A is a pin K formed in proximity to its lower end with an abutment $k$ and carrying at its upper end a piston L provided with a cupped packing $l$ which is held against the piston head through the medium of a nut $l^2$, the under face of which serves as a second abutment upon the pin K to limit its downward movement in the casing. Within the cylinder G is a coil spring M which presses against the piston L to hold it and the valve unseating pin K in their downward limiting position and adapted to permit said piston to move to its upward limiting position, as shown in Fig. 2, when the piston is acted upon by fluid pressure sufficient to overcome the compressive force of the spring. Within the top of the cylinder G is a guiding thimble N for the spring.

The fitting H is formed with an angular upwardly-extending arm $h$ having a laterally-protruding lug $h'$ on which is pivotally mounted, as shown at $h^2$, a channel-shaped lever O. The fitting H below the lower branch of the angular arm $h$ is laterally slotted, as shown at $h^3$, to accommodate the arm $p$ of an angularly bent spring blade P, the end of the other arm $p'$ of which is fastened to the inner web of the channel lever, as shown at $p^2, p^3$. The spring blade P intermediate its ends abuts against the outer edge of the lug $h'$, and the lever at its lower end in proximity to the points of contact between the spring and the lug $h'$ has its web cut away, as shown at $o$, for a purpose which will presently appear. The lever O is eccentrically mounted upon the lug $h'$ so that as the lever O is pivotally moved or drawn toward the casing E or cylinder G the spring P is flexed around the lug $h'$ and the end of the branch $p'$ is retracted in the recess $h^3$.

The device in use has the tubular portion B connected with a source of pressure fluid, there being a valve (not shown) interposed in the line to control the flow of fluid therethrough. To apply the tire connection to a valve stem Q having a nipple $q$, the device is grasped in the palm of the hand of an operator, whereby the spring P is flexed to withdraw the end into the recess $h^3$ and the fitting H applied over the valve stem until the packing J contacts with the end of said nipple. Upon releasing the lever O the free end of branch $p$ of the spring will engage within the screw threads on the nipple to hold the device thereon. When so applied, the valve unseating pin K will unseat the valve check R and compress the valve spring $r$ to its maximum extent, as shown in Fig. 1, it being apparent that the force of the spring M acting against the piston L is greater than the force of the spring $r'$ acting against the valve check R. Upon fluid under pressure being introduced into the valve stem through the tube extension B and passage F, part of said fluid will find its way up through the duct E around the pin K and act upon the piston L. As said line pressure is normally in excess of the pressure of the spring M upon the piston, said piston will be moved upwardly but checked in said movement by the abutment $k$ engaging with the shoulder $a$ at the lower end of the duct E. This upward or rearward movement of the valve unseating pin K will permit the valve check $r$ to partially return toward its valve seat and thus relieve the valve inside spring $r$ from its maximum pressure, as best shown in Fig. 2. It will be appreciated that this partial return movement of the check toward its seat will also take place prior to the passage of fluid through the device if the pressure within the tire or tube to which the device is applied exceeds the force of the spring M upon the piston L.

In the process of vulcanizing inner tubes having the valve stems fitted therein, the valve must be held open for approximately ten minutes, and if the compression strain upon the valve inside spring is not relieved, said springs sometimes become set and do not function to properly reseat the check. After the vulcanizing operation the pressure fluid must be relieved from the tube, and when the tubular extension B is connected with a source of fluid suction or to the atmosphere, the outrush of fluid from the tube through the passage F withdraws the pressure from the under side of the piston L and permits the valve check to again assume the position shown in Fig. 1. Since the venting of fluid from the tube requires but a few seconds, it will be appreciated that the brief interval that the valve check spring is subjected to this maximum compressive stress is not detrimental thereto.

While I have shown and described a preferred embodiment of my invention I do not wish to be limited to the details of construction disclosed, since it will be understood that any form of pressure-responsive means associated with the valve pin unseating means may be employed, as well as any type of coupling means. The construction as herein disclosed is therefore subject to modification without departing from the spirit of the invention.

What I claim is:

1. A device of the character described, comprising a housing having means for connection with a tire valve or the like, means for establishing fluid communication between the interior of the tire valve and a source of fluid pressure or suction, a movable tire valve depressor for unseating the check valve within the tire valve when the housing is connected thereto, and a member controlling the movement of the tire valve depressor, said member being responsive to fluid pressure within the housing to control the position of the tire valve depressor and the extent to which it holds the check valve unseated.

2. A device of the character described, comprising a housing having means for connection with a tire valve or the like, means for establishing fluid communication between the interior of the tire valve and a source of fluid pressure or suction, a movable tire valve depressor for unseating the check valve within the tire valve when the housing is connected thereto, said tire valve depressor being responsive to fluid pressure and operative to depress the check valve a greater amount while venting fluid from the tire than while introducing fluid under pressure thereto.

3. A device of the character described, comprising a casing having a socket adapted to engage over a tire valve, a valve unseating pin movable in said socket, a piston carried by said pin, means acting against said piston and normally holding said pin in one position within the casing, said pin being adapted to be moved to another position and there held when the normal pressure on the piston is counteracted by fluid pressure.

4. A device of the character described, comprising a casing having enlarged chambers connected by a duct, a piston movable in one of said chambers, a pin in said duct connected to the piston, means limiting the movement of the piston, and resilient means acting upon the piston normally maintaining it in one of its limiting positions within its chamber.

5. A device of the character described, comprising a casing having a socket adapted to engage over the nipple end of a tire valve or the like, a valve unseating pin movable in said socket, a packing within said socket adapted to contact with the end of the tire valve nipple to make a packed joint therewith, said casing having an opening through which the valve unseating pin extends, a piston carried by said pin, a passage for fluid under pressure leading from said socket below the piston, resilient means acting against said piston and normally holding the valve unseating pin in its lowermost position within the casing and permitting said pin to move to its uppermost position when fluid under pressure is admitted to said socket.

6. A device of the character described, comprising a casing having a socket adapted to engage over the nipple end of a tire valve or the like, a fluid pressure duct leading to said socket, and coupling means for securing said casing to a valve stem, said coupling means comprising an angularly bent spring blade, one end of which is adapted to engage between the threads on the tire valve to hold the coupling thereon, and an operating lever extending in substantially parallel relation to the casing, said coupling-operating lever and casing being so related that both may be simultaneously gripped by the hand of an operator, and when so gripped the spring is flexed to permit the socket to pass over the valve stem nipple.

In witness whereof, I have hereunto signed my name.

WILLIAM J. KIRKPATRICK.